Figure 1:
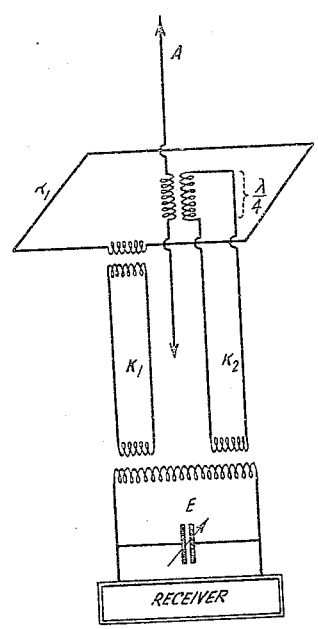

Inventor
WILHELM RUNGE

Patented Dec. 27, 1932

1,892,221

UNITED STATES PATENT OFFICE

WILHELM RUNGE, OF BERLIN, GERMANY, ASSIGNOR TO TELEFUNKEN GESELLSCHAFT FÜR DRAHTLOSE TELEGRAPHIE M. B. H., OF BERLIN, GERMANY, A CORPORATION OF GERMANY

POLARIZATION DIVERSITY RECEPTION

Application filed January 30, 1929, Serial No. 336,125, and in Germany February 18, 1928.

This invention relates to the reception of short wave signals, and more particularly to a polarization diversity receiving system therefor.

The object of the present invention is to provide a receiver arrangement adapted to obviate fading caused by the rotation of the plane of polarization of a received radio wave. It is known from practical experience, based upon numerous observations, that the electrical field when reaching the receiving point is in a different state of polarization from that at the point of origin of the field, and rotation of the plane of polarization has been observed. Owing to such rotation of the plane of polarization relative to the orientation of the receiving antenna there frequently occurs a more or less great extinction or diminution of the incoming energy, known as fading. According to my invention I use two antennæ orientated at right angles to each other, one of which is to pick up one component, and the other the second component of the incoming electric field no matter what its orientation, and I combine the energy from these two antennæ to act upon a joint receiver apparatus.

However, this procedure alone may fail to eliminate the disturbance because the two components of the antenna oscillations are cophasal as to time and become added algebraically in the common receiver circuit, and the potentials induced by the two antennæ may be either in equal or in opposite phase relationship, so that fading is not avoided. Now, according to the present invention an artificial phase displacement amounting to an angle of 90 degrees is produced between the oscillations transferred from each of the antenna to the joint receiver circuit. Then no extinction can be caused no matter what the rotation of the plane of polarization, for the two components can only be added geometrically. In the presence of a phase difference of 90 degrees there is always obtained the same resultant intensity regardless of the prevalent angle of inclination of the plane of polarization. This can be readily seen from the geometrical relations. If $V$ is the voltage vector being turned relative to the vertical antenna an angle denoted by $a$, then the instantaneous value of the component induced in the vertical antenna is $v_A = V \cos a \sin wt$, the corresponding value in the horizontal antenna is $v_R = V \sin a \cos wt$. Now, if one of the oscillations is given a phase angle of 90 degrees compared with the other oscillation, then the component, $v_A = V \cos \sin wt$ and $v_R = V \sin a \cos wt$, give a resultant amplitude in the present case of $$\sqrt{V^2 \sin^2 a + V^2 \cos^2 a} = V,$$

which, as can be seen, is independent of the angle $a$. In other words, in the common radio frequency circuit I obtain a potential which is independent of the angle of polarization of the incoming field.

Figure 2:
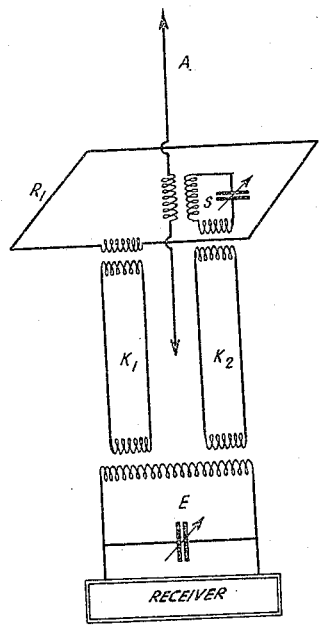
Figure 3:
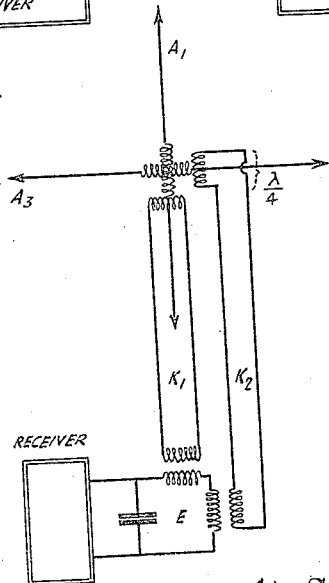

My invention is described more in detail in the following specification, accompanied by a drawing in which Figure 1 is an arrangement in which phase displacement is obtained by unequal transmission line length; Figure 2 is a modification in which phase displacement is obtained by resonance; and Figure 3 is a modification using two linear antennæ.

In Figure 1, A is a vertical antenna, R1 a horizontal frame-type or loop antenna, K1 and K2 transmission lines or leads which, though otherwise similar electrically, are made different in length so that there results a difference in path of ¼ or an odd number of quarter wave-lengths. What is then obtained in the joint receiver circuit E is the sum total of the two oscillations when phase displaced by an angle of approximately 90 degrees.

This phase angle of 90 degrees can be obtained also by inserting an oscillation circuit tuned to the working wave between one of the antennæ and the line, or between the line and the receiving circuit. This is shown in Figure 2, in which the two lines K1 and K2 are perfectly alike, but between antenna A and the line K2 there is connected a supplementary oscillation circuit S.

Of course, the phase difference of 90 degrees is obtainable also in some other manner, say, by so detuning the two antennæ with reference to each other that their currents present a phase difference of 90 degrees. Also, the antennæ which are employed may be of like as well as of different design. The preferable plan is to use a vertical elevated antenna and a horizontal frame antenna in order to make the reception independent of the azimuth of the incident wave. However, it is evident that the horizontal antenna need not be of the frame or loop kind in order to obtain the desired polarization diversity.

For example, it may also be of the straight type, and an arrangement of this kind is suitably provided whenever the antenna system is to be used for reception always from a definite direction. The arrangement which is suited best in practice is shown in Figure 3, where two linear antennæ A1 and A2 are united with the joint radio frequency circuit by way of two lines which are similar, but of different length. In this instance, as in the embodiment shown in Figure 1, the phase angle is obtained by a difference in electrical length amounting to a quarter-wave. The orientation of these two linear antennæ may be at right angles to each other and may be so chosen that one of these antennæ is mounted horizontally and the other one vertically. If preferred, the normally vertical antenna, while remaining at right angles to the horizontal antenna, may be disposed at a certain angle of inclination. These various ways of orientation of the antennæ in order to insure a preferred direction of reception are well known in the prior art, but with all of these the basic principle of the invention, i. e., an artificial phase displacement, may be used.

I claim:

An arrangement for the reception of electromagnetic waves comprising a vertical antenna and a horizontal antenna at right angles to each other, said antennæ being connected to transmission lines with a joint radio frequency circuit, one of said transmission lines being longer than the other by a length equivalent to one quarter of the communication wave whereby the oscillations of both antennæ are fed to said radio frequency circuit with a phase displacement angle of 90 degrees.

WILHELM RUNGE.